United States Patent [19]
Chiola et al.

[11] 3,798,479
[45] Mar. 19, 1974

[54] FLUORESCENT LAMP WITH PARTICULAR PHOSPHOR COATING

[75] Inventors: Vincent Chiola; Robert W. Ormsby, both of Towanda, Pa.

[73] Assignee: GTE Sylvania Incorporated, Seneca, N.Y.

[22] Filed: Sept. 13, 1971

[21] Appl. No.: 179,626

Related U.S. Application Data
[62] Division of Ser. No. 46,593, June 16, 1970, abandoned.

[52] U.S. Cl. ............................................... 313/109
[51] Int. Cl. ........................................... H01j 61/44
[58] Field of Search ................................... 313/109

[56] References Cited
UNITED STATES PATENTS
| | | | |
|---|---|---|---|
| 3,581,139 | 5/1971 | Haft et al. | 313/109 |
| 2,854,600 | 9/1958 | Van De Weijer et al. | 313/109 |
| 2,962,616 | 11/1960 | Homer et al. | 313/109 |

Primary Examiner—Palmer C. Demeo
Attorney, Agent, or Firm—Norman J. O'Malley; Donald R. Castle; William H. McNeill

[57] ABSTRACT

Halophosphate phosphors having desired particle size distribution, bulk density and improved dispersability and increased lumen output per unit weight of phosphor incorporated into a fluorescent lamp are prepared by firing the raw materials under conventional firing techniques, finely-dividing the fired phosphors, mixing with aqueous solutions of an appropriate acid and base, washing with water to remove residual acid and base, separating wet solids from the water, freezing the ice within the solids and removing the residual water from the solids by subjecting the frozen solids to an absolute pressure of from about 30 to about 3200 microns of mercury and to a temperature of between about 0° C to −50°C.

3 Claims, 1 Drawing Figure

PATENTED MAR 19 1974
3,798,479
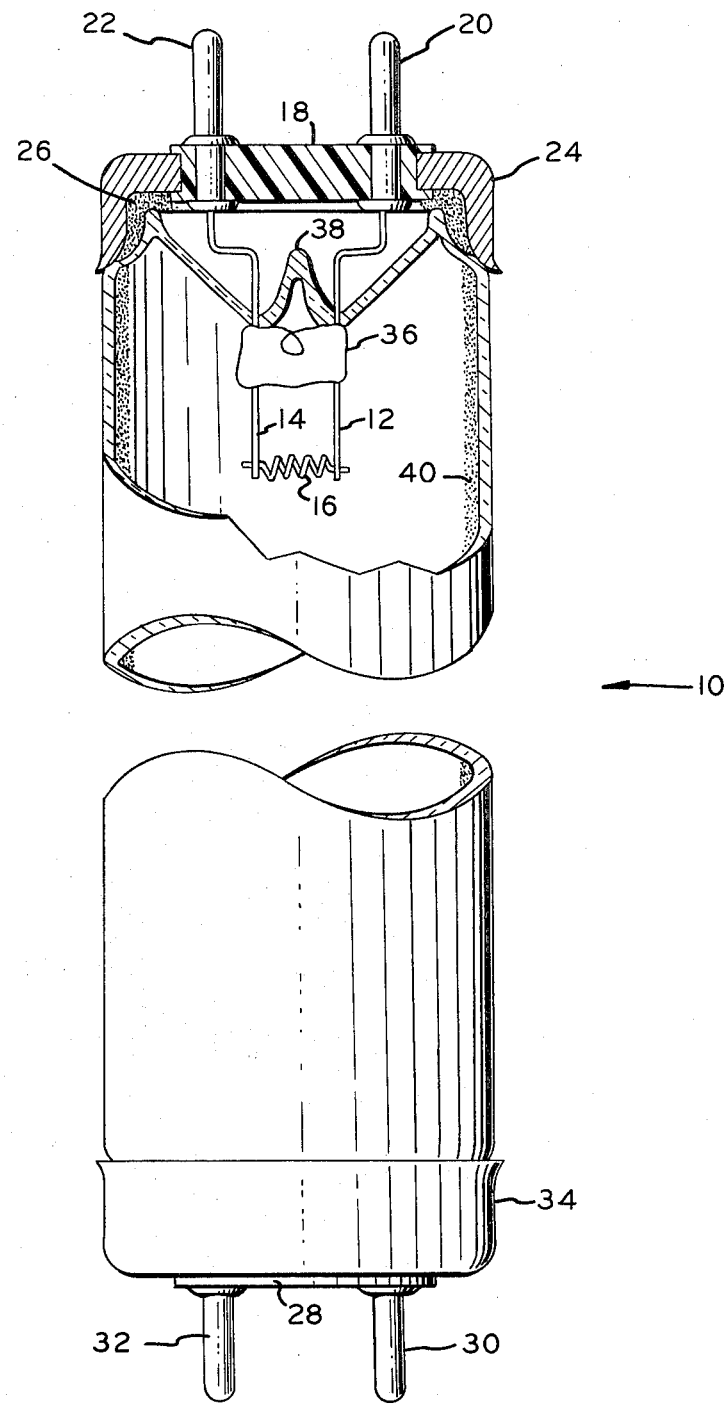
INVENTORS.
VINCENT CHIOLA &
ROBERT W. ORMSBY
BY
Donald R. Castle
ATTORNEY 3,798,479

FLUORESCENT LAMP WITH PARTICULAR PHOSPHOR COATING

CROSS REFERENCE TO RELATED APPLICATION

This application is a divisional application of Ser. No. 46,593, filed June 16, 1970, which is assigned to the assignee of the present invention, and now abandoned.

BACKGROUND OF THE INVENTION

1. Field of the Invention

This invention relates to phosphor materials. More particularly, it relates to improved halophosphate phosphors, a fluorescent lamp utilizing such improved phosphors and methods for processing halophosphate phosphors to achieve the improved phosphors.

2. Prior Art

Halophosphate phosphor materials for fluorescent lamps are well known. These phosphors are essentially a haloapatite phosphor and are prepared by blending powdered constituents and firing under appropriate conditions to effect suitable solid state reactions and formation of a sintered product. After size reduction by milling, the fired product can sometimes be refired and again milled. Whether it undergoes a second firing or not, the finely divided phosphor is usually washed in acidic, basic and water mediums before final drying. Drying has heretofore been done by several means such as rotary drying or as described in U.S. Pat. No 3,023,339, wherein drying is accomplished by atomizing a phosphor-liquid slurry at elevated temperatures, i.e., spray-drying to effect moisture removal. After drying, and for application to and use in manufacturing fluorescent lamps, the dried phosphor is incorporated into a film-forming solution, either aqueous or organic-base to form a coating suspension.

A typical film-forming solution consists of from about 2 percent to about 7 percent by weight of ethylcellulose dissolved in a solvent consisting of xylol and butanol. Additionally, from about 1 percent to about 3.5 percent by weight of dibutyl phthalate is used as a plasticizer. Certain dispersion aids such as primary aliphatic amines are sometimes used to disperse the phosphor particles. Less than 1 percent of such dispersion aids are generally used. Relatively concentrated suspension or dispersions of phosphors in the film-forming solutions are used such as from 40 percent to 60 percent by weight.

In order to achieve a uniform suspension generally the film-forming solution and the phosphors are ball-milled together for a period of time. This ball-milling causes breakup of agglomerates, aggregates and larger particles. Milling also serves to attain uniform wetting and dispersion. One problem associated with ball-milling is that the average size of the phosphor particles also become smaller. As the length of time of ball-milling is increased due to excessive initial agglomeration the amount of finer particles such as below 3 microns increases. It is well known in the art that these smaller particles decrease the luminous output of the phosphor. The rotary dried phosphors have a tendency to agglomerate, thus requiring excessive ball-milling. Spray-dried phosphors do not exhibit a tendency to agglomerate, however, fine particles, that is, less than 3 microns are not eliminated. Even minor amounts of the small particles have a major effect upon brightness. Additionally, all of the water used to slurry the phosphor in the last wash stage is removed via evaporation at atmospheric temperature, therefore, increasing the heat input per pound of phosphor.

It is believed, therefore, a halophosphate phosphor having a desirable particle size distribution, improved bulk density, increased dispersibility in the film-forming medium and when incorporated into a lamp yields increased luminosity per unit of phosphor used is an advancement in the art.

SUMMARY OF THE INVENTION

In accordance with one aspect of this invention, there is provided and improved halophosphate phosphor having a particle size range from about 3 to about 30 microns, a bulk density of from about 9 to about 10 grams per cubic inch, an increased dispersibility in a film-forming media and increased luminosity per unit weight of phosphor incorporated into a lamp.

In accordance with an additional aspect of this invention, there is provided a process wherein halophosphate phosphor-forming ingredients are fired under conditions to form a luminescent material, finely dividing the luminescent material to a material maximum particle size below about 30 microns and a minimum particle size above about 3 microns, treating said finely divided luminescent material with an aqueous solution of an acid, washing with sufficient water to remove residual acid, treating with an inorganic base and washing with sufficient water to remove the residual base, separating the solids from the water and freezing water in said solids and thereafter freeze drying the solids under an absolute pressure of from about 30 to about 3200 microns of mercury and at a temperature of from about 0° C to about −50° C for a sufficient time to remove residual water.

In accordance with an additional aspect of this invention, there is provided an improved lamp utilizing the improved phosphor of this invention.

BRIEF DESCRIPTION OF THE DRAWINGS

The FIGURE is a fluorescent lamp of this invention having a cut-away portion at one end.

For a better understanding of the present invention, together with other and further objects, advantages, and capabilities thereof, reference is made to the following disclosure and appended claims.

DESCRIPTION OF THE PREFERRED EMBODIMENTS

The raw materials and the firing step to produce luminescent halophosphate phosphors is well known in the art and will not be detailed herein. Typical raw materials include calcium hydrogen phosphate, calcium carbonate, manganous carbonate, antimony trioxide, strontium oxide, cadmium oxide, ammonium chloride and calcium fluoride. The foregoing materials are fired at about 1100° C to about 1200° C for a sufficient period to convert the materials to a halophosphate phosphor. The fired material is subjected to a dividing action such as milling to produce a material having essentially all of the particles greater than about 3 microns and essentially all of the particles less than about 30 microns. A typical phosphor is a cool white luminescent phosphor having $x$ and $y$ ICI color coordinates of about 0.370 and 0.380 respectively. As previously discussed, the resultant finely divided material is washed, first with an aqueous solution of an acid and followed by washing with an inorganic base to dissolve particles that are not satisfactory luminescent materials. The acids that are used are generally relatively weak acids such as diluted inorganic acids or organic acids. Typical useful acids include nitric, acetic, hydrochloric and the like. Generally a slurry is formed having a specific gravity of from about 1.28 to about 1.31 adjusted to a pH of from about 3.8 to about 4.2. The slurry is filtered and solids are washed with water. Generally about 1 gallon of water per 10 pounds of solids is sufficient. The solids are reslurried with water to form a slurry, having a specific gravity of from about 1.28 to about 1.32. The pH is adjusted with an inorganic base to a pH of about 7.8 to about 8.2. The slurry is thereafter filtered and washed with about the same amount of water used to remove the residual acid. The solids are filtered from the water and generally contain an appreciable amount of water, that is, up to about 20 percent by weight of the wet solids.

The solids are then transferred to a freezer wherein the water is frozen to ice. Thereafter, the solids containing the ice are subjected to an absolute pressure that is quite low such as from about 30 to about 3200 microns of mercury. The ice sublimation removes the water from the solids. The temperature of the phosphors during ice sublimation does not exceed about 0° C and generally is from about 0° C to about −50° C with from about −10° C to about −40° C being preferred. Essentially no agglomeration of the phosphor particles occurs. The water vapor removed from the wet solids is condensed on a refrigerated surface generally at about −40° C thereby enabling faster removal of the water from the wet solids and while maintaining the low pressure. The time required for removal of the water will be dependent upon several factors such as condenser capacity, vacuum source, amount of solids to be dried, etc. The heat input is regulated so that the product temperature does not exceed about 25° C even after the ice is sublimed. If the heat input is too high the product can melt which is undesirable.

Fluorescent lamps are prepared under normal lamp production techniques, that is, by slurrying the phosphors in suitable lacquers, blinders and the like and baking out under controlled conditions. The lamp so produced exhibit essentially no agglomeration or coarse particles of halophosphate phosphor on the surfaces. The slurries produced for coatings have specific gravities significantly lower than slurries made from conventionally dried phosphors. The powder or coating weight necessary to achieve standard coverage of a standard 40 watt fluorescent lamp is from about 0.2 to about 0.5 grams lower than the weight used in conventionally dried phosphors.

In the FIGURE, the sealed glass envelope 10 has the lead-in wires 12 and 14 sealed through one of its ends and the corresponding lead-in wires (not shown) sealed through the other end. The usual coiled-coil 16 of tungsten wire is supported between and electrically connected to, the pair of lead-in wires 12, 14 and a similar coil is supported by and connected to the lead-in wires at the other end of the envelope 10. An insulating base piece 18 having contact pins 20 and 22, each pin being connected to one end of the lead-in wires 12 and 14, held in metal cap 24, which is fixed by the cement 26 to one end of the envelope 10 and a similar bas piece 28 having contact pins 30 and 32 is cemented to the other end by cup 34.

The tungsten coil carries the usual electron-emitting coating of alkaline earth oxides, generally including also a small percentage of zirconium dioxide.

A filling of inert gas such as argon at about 2 millimeters of mercury pressure, and the usual small quantity of mercury is inside the glass envelope 10. The lamp has the usual stem press 36 and sealed exhaust tube 38.

On the inside surface of the envelope 10 is a coating 40 of the phosphor of this invention which is a helophosphate phosphor as described below having improved particle size, suitable bulk density and improved dispersibility in the film forming solution used to apply the coating to the inside of the envelope 10. Since the luminosity per unit weight of the phosphor is increased, the coating 40 can be thinner than the prior art coatings for the same lumen output or the thickness of the coating 40 can remain the same as the prior art coating with an increase in lumen output from the lamp.

The bulk density of the freeze-dried halophosphates of this invention are from about 9 to about 10 grams/cubic inch. Rotary dried halophosphate phosphors generally have a bulk density below about 9 grams/cubic inch and spray-dried halophosphate phosphors have a bulk density above about 11 grams/cubic inch.

The halophosphate phosphors of this invention and rotary-dried phosphors have a particle size range of from about 3 to about 30 microns, with a typical approximate particle size distribution as follows:

Less than 4.9 microns — 0.5 percent
Less than 9.3 microns — 11.1 percent
Less than 14.7 microns — 48.5 percent
Less than 29.3 microns — 99.2 percent
Median Particle Size — 14.9 Microns A typical spray dried halophosphate has a similar particle size range but with a different distribution.

A typical approximate particle size distribution is as follows:

Less than 4.9 microns — 0.8 percent
Less than 9.3 microns — 14.6 percent
Less than 14.7 microns — 54.0 percent
Less than 29.3 microns — 99.7 percent
Median Particle Size — 14.0 Microns Thus, the phosphors of this invvention have more of the particles at the larger size without an appreciable sacrifice in bulk density as with the rotary-dried material. The foregoing particle size distribution can shift about 10 percent within each range or sizes given. For example, the median particle size of the phosphors of this invention can vary from about 14.5 to about 15.5 microns and the median particle size can vary from about 13 to about 14 microns. In each instance, however, the freeze-dried phosphor of this invention will have about the same particle distribution as rotary dried phosphors and contain a smaller percentage of particles in the smaller particles size range (below about 9.3 microns) than spray-dried phosphors. It is to be noted that greater than about 88 percent of the particles of this invention are larger than 9.3 microns wherein with spray-dried materials less than 88 percent are larger than 9.3 microns.

The phosphors of this invention are more readily dispersed in the film forming media than the rotary-dried phosphors, therefore, a minimum of time of mixing is required to obtain a uniform mixture, since the phosphor of this invention does not tend to agglomerate.

The result of less mixing or wet milling time is less particle attrition and a high luminosity in the fabricated lamp.

Dispersibility of various solids in film-forming solutions has traditionally been a problem associated with the paint industry. One of the common desirable properties of the film-forming solutions with the dispersed solids in both the lamp industry and the paint industry is the uniform dispersion of the solids to enable a uniform coating to be applied to a substrate. It is important in both industries to establish how much mixing is required to obtain a uniform dispersion of solids in the film-forming solution. Dispersibility tests used in the paint industry have been found to be applicable to fluoresent lamp manufacture. Details of such tests can be found in "Physical Examination of Paints, Varnishes, Lacquers and Color" (also known as the Paint Testing Manual) by Gardner and Sword, Gardner Laboratories Inc., Bethesda, Maryland (1962). Using a Heggeman gauge as specified in ASTM-1210 it has been indicated that the phosphor of this invention are uniformly dispersed in a suitable film-forming solution is less than 15 minutes. Essentially the same phosphors except dried by a conventional rotary drier are not uniformly dispersed in the same film-forming solution after 30 to 60 minutes of ball milling. The North Standard (NS) readings on dispersions of solids in a suitable film-forming solution remain constant after 15 minutes of ball-milling when phosphors of the present invention were used. With rotary-dried phosphors the NS readings increased throughout the 60 minute period of ball-milling.

The phosphors of this invention yield an improved distribution over either of the types heretofore known. The particle size distribution of the phosphors of this invention as manufactured is better than the particle size distibution of spray dried halophosphate phosphors. The particle size distribution of the phosphors of this invention can remain virtually unchanged since they are readily dispersible in film-forming solution whereas excessive mixing is required with rotary dried phosphors with the attendant particle size attrition. Thus, the lamp manufactured using the phosphor of this invention contains phosphors having a better particle size distribution than any of the lamps heretofore manufactured.

To more fully illustrate the subject invention, the following detailed examples are presented. All parts, proportions, percentages are by weight unless otherwise indicated.

EXAMPLE 1

The following ingredients are relatively mixed in a V-type blender:

|  | Parts | Percent by weight |
|---|---|---|
| Calcium Hydrogen Phosphate ($CaHPO_4$) | 2890.0 | 67.58 |
| Calcium Carbonate ($CaCO_3$) | 882.0 | 20.62 |
| Calcium Fluoride ($CaF_2$) | 241.2 | 5.68 |
| Ammonium Chloride ($NH_4Cl$) | 67.4 | 1.59 |
| Manganous Carbonate ($MnCO_3$) | 69.9 | 1.63 |
| Antimony Oxide ($Sb_2O_3$) | 72.4 | 1.69 |
| Cadmium Oxide ($CdO$) | 53.9 | 1.23 |

The mixture is fired in a nitrogen atmosphere at a temperature of about 2050°–2150° F to convert the materials into a phosphor composition. The phosphor is hammer milled, then wet classified to achieve a particle size range of from about 3 to about 30 microns. An aqueous slurry having a specific gravity of about 1.3 is prepared and sufficient hydrochloric acid is added to adjust the pH to about 4.0. The solids are separated from the slurry by filtration and are washed with about 0.83 parts of water per one part of solids. The solids are again slurried in water to obtain a slurry having a specific gravity of about 1.3. Sufficient concentrated ammonium hydroxide is added to adjust the pH to about 8.0. The slurry is thereafter filtered and the separated filter cake washed with about 0.83 parts of water per one part of solids. The filter cake after wash contains about 20 percent water.

The wet solids are divided into two parts. One part is dried in a conventional rotary drier using air heated to a temperature of about 900° F. The other part of wet solids is placed in trays in a freeze drier. The drier is equipped with a refrigeration system on the shelves supporting the trays and the temperature is lowered to about $-10°$ C to thereby freeze the water in the solids. The absolute pressure inside the drier is lowered and maintained between about 200 and 1,000 microns of mercury. Electrical heating on the shelves maintains the product temperature below about 0° C until the sublimation of the ice formed during the freezing of solids is complete. The condenser temperature is maintained at about $-'°$ C to condense the sublimed vapors from the ice. Dryness of the solids is determined by the cessation of sublimation and an increase in product temperature. Heat input is decreased as the sublimation decreases to prevent the product temperature from exceeding about 0° C.

Samples of each of the dried materials are incorporated into lamps by slurrying the phosphors in the vehicles for coating using the following procedure:

About one gallon of an ethylcellulose lacquer containing about 7% ethylcellulose and about 35 percent dibutyl phthalate as a plasticizer and the remainder a solvent consisting of xylol and butanol is placed in ball mill having ¾ to 1 inch flint pebbles in about 50 percent of its volume. Less than about 15 minutes is required to achieved a uniform dispersion with the freeze dried sample while at least 60 minutes are required to obtain a uniform mixture with rotary-dried material.

Lamps are coated, fabricated and the luminosity measured after 100 hours of operation. With the freeze dried material only about 7.2 to about 7.6 grams of phosphor is deposited on the tube while with the rotary dried material about 7.8 grams are used. The 100 hour brightness on lamps using freeze-dried phosphors is about 3196 to 3202 lumens while on the rotary-dried phosphor the level is about 3193 lumens. Additionally, the lamp from the rotary-dried phosphor has some agglomeration while none is detected with the freeze-dried phosphor.

While there have been shown and described what are at present considered the preferred embodiments of the invention, it will be obvious to those skilled in the art that various changes and modifications may be made therein without departing from the scope of the invention as defined by the appended claims.

What is claimed is:

1. A fluorescent lamp comprising a light-transmitting envelope having electrodes operatively disposed therein and containing an inert ionizable gas and a charge of mercury, a halophosphate phosphor coating on the inner surface of said envelope, said phosphor having a particle size of from about 3 to about 30 microns and a bulk density of from about 9 to about 10 grams per cubic inch and having at least about 88 percent of said particles greater than about 9.3 microns.

2. A lamp according to claim 1 wherein said bulk density of said phosphor is from about 9.3 to about 9.6 grams per cubic inch.

3. A lamp according to claim 1 wherein said lamp is a 40 watt lamp and the amount of phosphor deposited is from about 7.2 to about 7.6 grams.

* * * * *

UNITED STATES PATENT OFFICE
CERTIFICATE OF CORRECTION

Patent No. 3,798,479  Dated March 19, 1974

Inventor(s) Vincent Chiola and Robert W. Ormsby

It is certified that error appears in the above-identified patent and that said Letters Patent are hereby corrected as shown below:

Column 4, Line 52: "size can" should read --- size of spray dried phosphors can ---.

Column 6, Line 27: "-10°" should read --- -40° ---.

Signed and sealed this 1st day of October 1974.

(SEAL)
Attest:

McCOY M. GIBSON JR.
Attesting Officer

C. MARSHALL DANN
Commissioner of Patents